Figure 2:
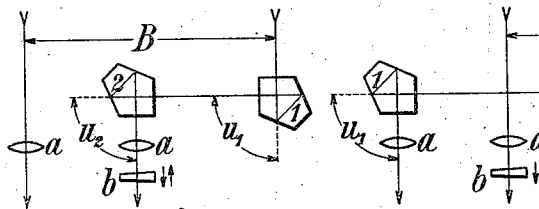

R. STÜTZER.
TELEMETER.
APPLICATION FILED JULY 30, 1912.

1,085,883.

Patented Feb. 3, 1914.
3 SHEETS—SHEET 1.

Witnesses:
Paul Krüger
Richard Hahn

Inventor:
Rudolf Stützer

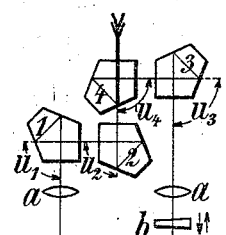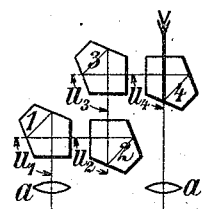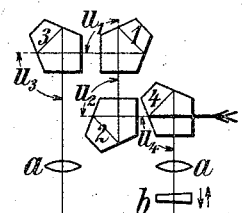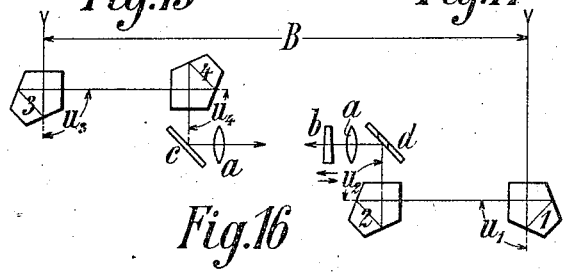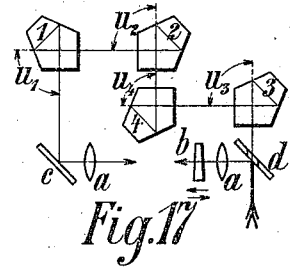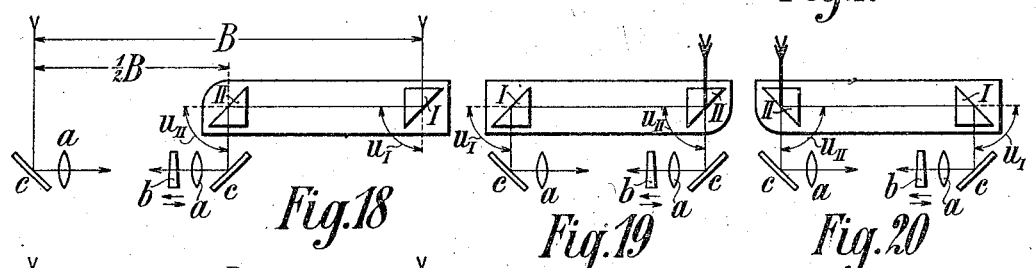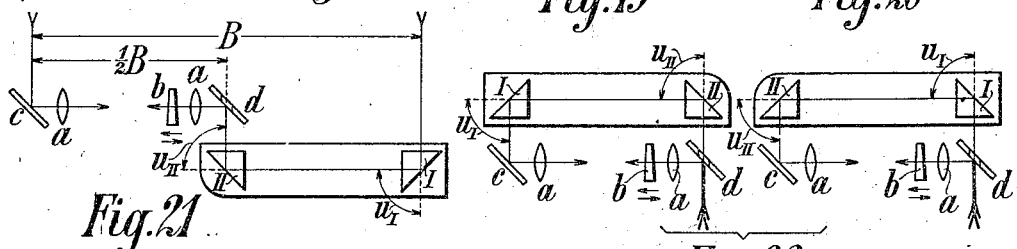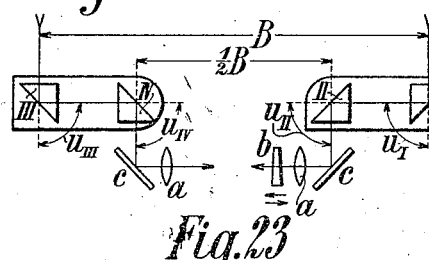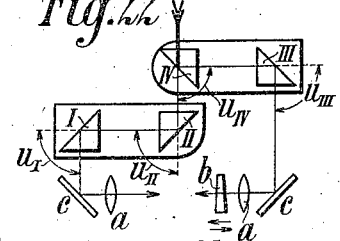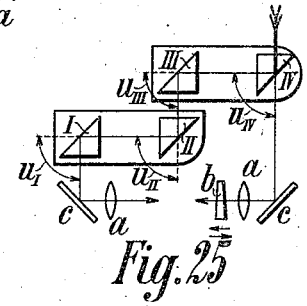

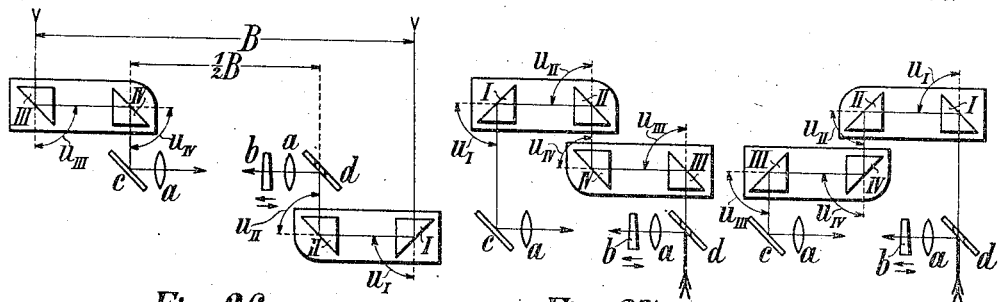
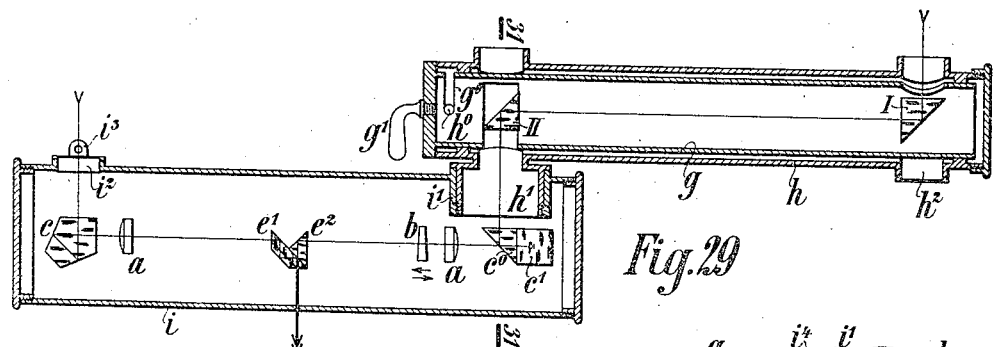
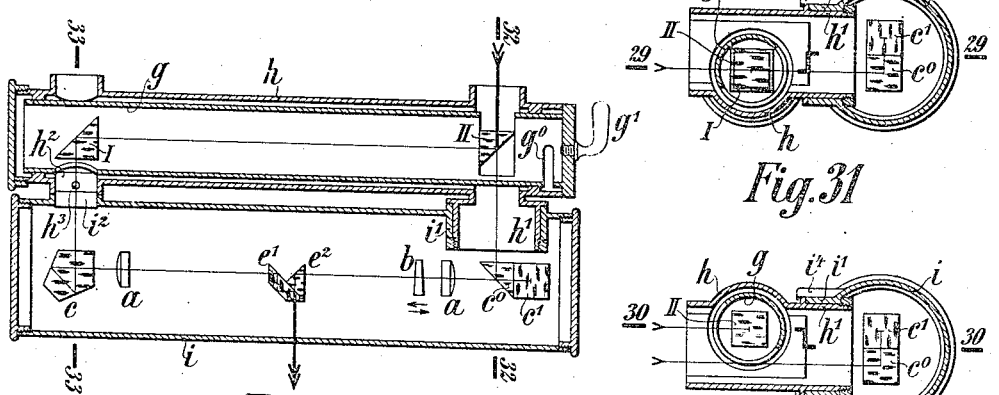
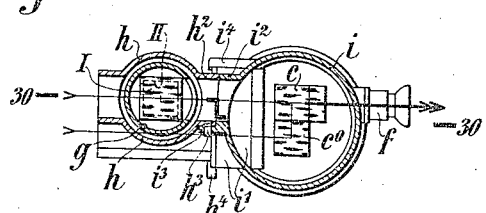

UNITED STATES PATENT OFFICE.

RUDOLF STÜTZER, OF JENA, GERMANY, ASSIGNOR TO THE FIRM OF CARL ZEISS, OF JENA, GERMANY.

TELEMETER.

1,085,883.  Specification of Letters Patent.  Patented Feb. 3, 1914.

Application filed July 30, 1912. Serial No. 712,347.

*To all whom it may concern:*

Be it known that I, RUDOLF STÜTZER, a citizen of the German Empire, residing at Jena, Germany, have invented a new and useful Telemeter, of which the following is a specification.

By the invention a certain class of telemeter is enriched by a new, advantageous kind. The following are the characteristics of this well-known class. In the front part of the telemeter a reflecting system is disposed in such a manner that it brings the two axial rays, which enter the telemeter parallel to each other at a distance apart in the sighting plane equal to the length of the base-line, closer together in the said plane, while preserving as far as possible their parallelism. Further, in order to neutralize for measuring purposes the contingent error of reflection (*i. e.* the small angle formed with each other in the sighting plane by the axial rays, which have entered the telemeter parallel to one another, after the action of the reflecting system on them or one of them), a device is provided for giving the reflecting system a second disposition, in which the error of reflection has the same value as in the first one. This class of telemeter is known from the patent specification 993,667 in four forms, which are there shown in Figures 1 and 2, Figs. 15 and 16, Figs. 21 and 22 and Figs. 23 and 24. In the first, third and fourth form the reflecting system alters the position of both axial rays, in the second only the position of one of these rays. The telemeter in all four forms can serve for measuring with either disposition of the reflecting system. On the two dispositions being interchanged the sense (sign) of the error of reflection is reversed: If previously convergence of the originally parallel axial rays was brought about, they are now made divergent to the same extent, and vice versa. Therefore, on setting the telemeter before and after this interchange by means of the measuring device for one and the same object, the range indicated must turn out different in both cases, so long as the error of reflection deviates from zero. Now the telemeter must, in order to find the range of an object correctly, be set twice, once with the reflecting system disposed in one way and again with it disposed in the other way, and from the two oppositely incorrect results of this double measurement the correct intermediate value be ascertained (page 6, lines 71 to 86 of 993,667). This roundabout method can be avoided only by fitting—as is done in the fourth form mentioned above—the reflecting system with a compensator, which permits of the error of reflection, that may be taken as unchangeable during a series of measurements, being in each case reduced to zero before the commencement of these measurements (page 6, lines 50 to 71 of 993,667).

The telemeter according to the present invention requires no double measurements with intermediate new disposition of the reflecting system, neither is there combined with its reflecting system a compensator having the purpose of reducing the error of reflection to zero. Of the two dispositions of its reflecting system one serves only for measuring, the other only for adjusting. With the characteristic of the well-known class, viz. that the error of reflection has the same value with both dispositions of the system, is connected in the case of the new kind the other characteristic, viz. that this error has with both dispositions the same sign. Furthermore, with the reflecting system in the adjusting disposition, the two axial rays have on entering the telemeter the distance zero apart in the sighting plane. As the object, whereby the adjustment is made, a distant object is employed, the distance of which need not be known, or the distant virtual image of a mark formed by a collimator. The two images of this adjusting object are set by means of the measuring device, as if the distance of the said object were to be measured. Thereupon on the indicating device the relative position of the scale and the index is adjusted in such a manner that the distance infinity is indicated. This completes the adjustment. After the measuring disposition of the reflecting system has been restored, the telemeter furnishes correct measurements. The reason is obvious: If, when measurements are being made, the object is infinitely distant, the two sighting lines are parallel to one another, as is the case when the reflecting system is in the adjusting disposition, and the indicating device must indicate infinity after the images are set, just as at the end of the adjustment, because, according to the above, the value and sign of the error of reflection have not altered by the change in the disposition of the reflecting system.

The reflecting system is composed as a rule of an even number of members. A single member may comprise several plane reflecting surfaces. In general on the disposition of the reflecting system being changed the relative position of the members will also be altered. In order to make it possible for all that, when this change is made, to retain the value of the error of reflection unaltered, the members of the reflecting system must, at least in part, have the property of invariable deflection, such as is $e.\,g.$ the case with optical square prisms. There is however a special case, in which the members retain their relative position in pairs and need therefore no longer singly have the property of invariable deflection, but may be constructed as simple reflectors or reflecting prisms. This case occurs, when, the reflecting system having the adjusting disposition, the direction of the entering axial rays (of the distance zero apart) is parallel to the direction of the same rays on the system having the measuring disposition, and when in addition to this, the reflecting system having the measuring disposition, this system brings the two axial rays closer together in such a manner that their distance apart becomes just half as great as on their entrance into the telemeter (as the length of the base-line).

The error of reflection can be represented as the difference $R-L$, when $R$ is understood to be the algebraic sum of all deflections, to which the axial ray passing through the right-hand objective is subjected by the reflecting system, and $L$ the corresponding sum for the axial ray passing through the left-hand objective. The deflections in the clockwise direction shall be reckoned as positive.

Figure 3:
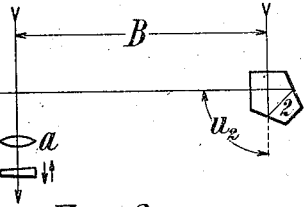
Figure 1:
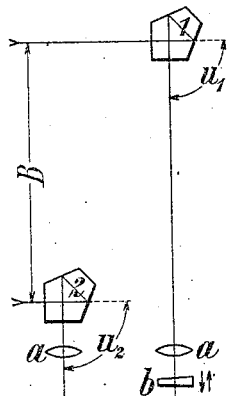
Figure 4:
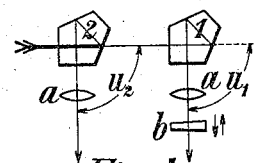
Figure 5:
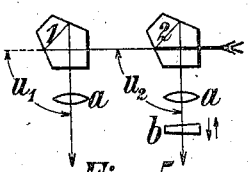
Figure 6:
Figure 7:
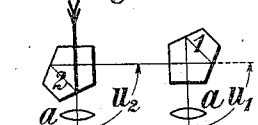
Figure 8:
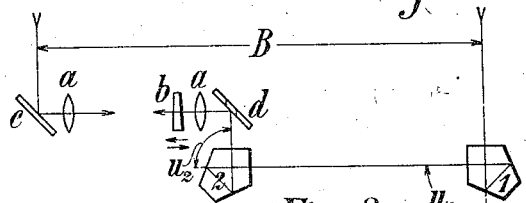
Figure 9:
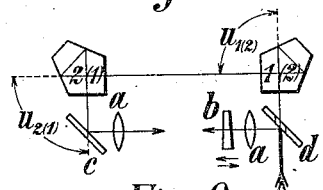
Figure 10:
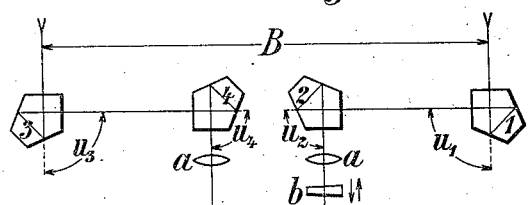
Figure 11:
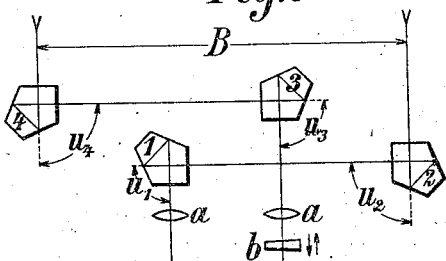
Figure 12:
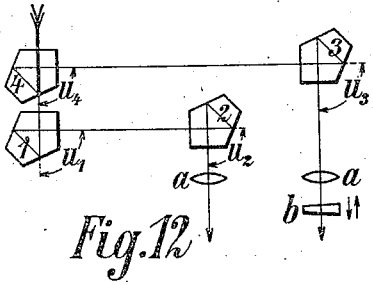

In the annexed drawing: Fig. 1 is a diagrammatic plan view of one form of the telemeter according to the invention in the measuring disposition. Fig. 2 is a similar view of another form of the telemeter. Fig. 3 is a similar view of another form of the telemeter. Fig. 4 is a diagrammatic plan view of an adjusting disposition according to the invention. Fig. 5 shows another form of such a disposition. Fig. 6 shows a third form of such a disposition. Fig. 7 shows a fourth form of such a disposition. Fig. 8 is a diagrammatic plan view of another form of the telemeter in the measuring disposition. Fig. 9 shows the two adjusting dispositions of the telemeter according to Fig. 8 in combination. Fig. 10 is a diagrammatic plan view of another form of the telemeter in the measuring disposition. Fig. 11 is a similar view of another form of the telemeter. Fig. 12 shows an adjusting disposition for the two telemeters according to Figs. 10 and 11. Fig. 13 shows another such disposition. Fig. 14 shows a third such disposition. Fig. 15 shows a fourth such disposition. Fig. 16 is a diagrammatic plan view of another form of the telemeter in the measuring disposition. Fig. 17 shows an adjusting disposition for the telemeter according to Fig. 16. Fig. 18 shows a modification of the telemeter according to Fig. 2 in the measuring disposition. Fig. 19 shows an adjusting disposition of the telemeter according to Fig. 18. Fig. 20 shows another such disposition. Fig. 21 shows a modified form of the telemeter according to Fig. 8. Fig. 22 shows the two adjusting dispositions belonging to the modification according to Fig. 21. Fig. 23 is a modified repetition of the telemeter according to Fig. 10. Fig. 24 shows an adjusting disposition of the telemeter according to Fig. 23. Fig. 25 shows another such adjusting disposition. Fig. 26 shows a modification of the telemeter according to Fig. 16. Fig. 27 shows an adjusting disposition of the modified telemeter according to Fig. 26. Fig. 28 shows another adjusting disposition of the telemeter according to Fig. 26. Fig. 29 is a horizontal axial section broken as indicated in Fig. 31 of a constructional example of the combination according to Figs. 18 and 19, the instrument being in the measuring disposition. Fig. 30 is a horizontal axial section broken as indicated in Figs. 32 and 33 of the instrument according to Fig. 29, in the adjusting disposition. Fig. 31 is a cross-section on line 31—31 of Fig. 29. Fig. 32 is a cross-section on line 32—32 of Fig. 30. Fig. 33 is a cross-section on line 33—33 of Fig. 30.

The base-line B is taken as horizontal.

In Figs. 1 to 3 behind the right-hand one of the two objectives $a$ the measuring device is indicated by a refracting prism $b$, which may be displaced in the direction of the objective axis. The reflecting system is composed of two members. Both members are formed as optical square prisms 1 and 2 of pentagonal form. The prism 1 has the invariable deflection $u_1$, the prism 2 the invariable deflection $u_2$. The reflecting system shown (the front one) need not be the only reflecting system of the telemeter, but is the only one that need be taken into consideration for the present invention. The objectives $a$ may also be disposed close together, side by side or one above the other, and in both cases be merged into a single objective. The telemeter can, as may be desired, show both images in one single ocular, $e.\,g.$ it may be a separating-prism telemeter, or it can have a special ocular for each of the two images, e. g. it may be a stereoscopic telemeter. In the last-named case in the form according to Fig. 3 with the right-hand objective (which receives the originally left-hand axial ray) the left-hand ocular is to be combined and with the left-hand objective (which receives the originally right-hand axial ray) the right-hand ocular—say by reversing prism systems, which cross one another—because otherwise the spatial image would be pseudoscopic and the measuring thereby rendered more difficult.

The error of reflection is determined in the three telemeters according to Figs. 1 to 3 in the following manner:

In Fig. 1
$$R=u_1 \text{ and } L=u_2, \text{ the error } R-L=u_1-u_2.$$

In Fig. 2
$$R=u_1-u_2, L=0, \text{ the error } R-L=u_1-u_2.$$

In Fig. 3
$$R=0, L=u_2-u_1, \text{ the error } R-L=u_1-u_2.$$

The error has therefore in these three forms of telemeter the same composition.

The four adjusting dispositions according to Figs. 4 to 7 may be used with each of the three telemeters according to Figs. 1 to 3, so that twelve different constructional forms result. In Figs. 4 and 5 the two reflecting prisms must and in Figs. 6 and 7 they can be disposed at different heights. Where the axial rays lie one above the other, they are distinguished by a thicker line. It is easily seen, that in all four dispositions the error of reflection $R-L$ is again $u_1-u_2$.

In Fig. 8 the reflecting system consists again of two pentagonal prisms 1 and 2. The axial rays, which this system brings closer together, first of all impinge on a second reflecting system $c$, $d$ and only then pass through the objectives $a$. In this case
$$R=u_1+u_2, L=0, R-L=u_1+u_2.$$

In Fig. 9, as has been indicated by the numbers in brackets, by interchanging the prisms 1 and 2 a second disposition is obtained, equivalent to that shown in the figure. A hole in the reflector $d$ indicates, that this reflector does not act on the axial ray belonging to the left-hand objective. In both adjusting dispositions $R=0$, in one
$$L=-u_1-u_2,$$

in the other
$$L=-u_2-u_1$$

and in both
$$R-L=u_1+u_2,$$

which corresponds with the error in the measuring disposition.

In Figs. 10 and 11 the reflecting systems are each composed of four members and may be supposed to have resulted from a doubling of the reflecting systems of Figs. 2 and 3 respectively. For Fig. 11 the remark made with reference to Fig. 3, alluding to the carrying out of this primary form as a stereoscopic telemeter, therefore also obtains.

In Fig. 10
$$R=u_1-u_2, L=-u_3+u_4,$$

hence
$$R-L=u_1-u_2+u_3-u_4.$$

In Fig. 11
$$R=-u_4+u_3, L=u_2-u_1$$

and again
$$R-L=u_1-u_2+u_3-u_4.$$

In Figs. 12 to 15 each example admits of more or less interchanges of the members, without the condition
$$R-L=u_1-u_2+u_3-u_4$$

being infringed. That this equation is realized in the four examples with the sequence of members as shown, is apparent from the following:

The telemeter in Fig. 16 has a reflecting system consisting of four members, which is composed of the two systems according to Figs. 2 and 8. In this case
$$R=u_1+u_2, L=-u_3+u_4,$$

the error
$$R-L=u_1+u_2+u_3-u_4.$$

In Fig. 17

$$R=0, \quad L=-u^3+u^4-u^2-u^1.$$
$$R-L=u^1+u^2+u^3-u^4.$$

In Figs. 18 to 28 from among the examples explained so far some are repeated with this modification, that the members are rigidly connected in pairs and constructed as simple reflecting prisms. These are special cases of the kind explained above. The error of reflection can be determined in the same manner as heretofore. The angles of deflection of the separate members are certainly no longer invariable, but each pair of members enters into the equations only with the algebraic sum of its deflections, and this value is invariable.

In Fig. 18 the designation of the prisms has remained the same as in Fig. 2, only that Roman instead of Arabic numerals have been chosen. With this difference the equations for R, L and the error R—L, given for Fig. 2, hold good.

The two adjusting dispositions, Figs. 19 and 20 of the telemeter according to Fig. 18 correspond to those of Figs. 6 and 7 respectively. Therefore the equations given for these two figures again hold good.

In Fig. 21 the equations given for Fig. 8 hold good. The two adjusting dispositions Fig. 22 belonging to this modification correspond to the two dispositions contained in Fig. 9.

For the modification, Fig. 23, the equations given for Fig. 10 obtain. The two adjusting dispositions, Figs. 24 and 25, correspond to Figs. 13 and 14 respectively, the equations given for these two latter figures holding good. Finally in Fig. 26 the equations given for Fig. 16 obtain. Of the adjusting dispositions Figs. 27 and 28, belonging to this modification, the first one corresponds to Fig. 17. That the second one does not differ from the first one as regards the magnitude and sign of the error of reflection, follows from the fact, that in both figures R=O, in Fig. 27

$$L=-u_{\mathrm{III}}+u_{\mathrm{IV}}-u_{\mathrm{II}}-u_{\mathrm{I}}.$$

and in Fig. 28

$$L=-u_{\mathrm{I}}-u_{\mathrm{II}}+u_{\mathrm{IV}}-u_{\mathrm{III}}.$$

The pairs of members with two parallel reflecting surfaces, which are employed in Figs. 18 and 23 and for the pair III, IV in Fig. 26, offer, as is well known, the advantage of requiring no adjustment at all, as they permit of every ray emerging parallel to itself. The same property appertains, as is also well known, to the so-called central reflector, in which three reflecting surfaces are disposed with the same relative inclinations as the three surfaces of a cube-corner. The pair of members I, II in Figs. 21 and 26 can however be converted into such a central reflector, if one of the surfaces of this pair be replaced by a ridge surface with its edge lying in the principal plane of reflection. In general the effect of this modification on the position of one of the images may be compensated by replacing in another part of the telemeter a ridge surface by a simple reflecting surface or by replacing a second simple reflecting surface by a ridge surface.

In the constructional example, Figs. 29 to 33, there is employed as objective prism system to the left-hand a pentagonal prism $c$, to the right-hand a combination of two prisms $c^0$, $c^1$, the lower one $c^0$ of which is a simple reflecting, the upper one $c^1$ a double reflecting prism. These objective prisms combined with a separating prism system $c^1$, $c^2$ of well-known construction convert the instrument into a coincidence telemeter in the more strict sense of this term. The ocular $f$, Fig. 33, serves for viewing its two erect images. The reflecting system I, II is mounted in a tube $g$, which is journaled so as to be rotatable about its axis in a special casing $h$. The rotation is limited to one of 180° by means of a slot $g^0$ and a pin $h^0$. By the direction of the manipulating handle $g^1$ the angular position in each case of the tubular mount $g$ may be observed. The casing $h$ of the reflecting system is rotatably connected with the main casing $i$ of the telemeter by means of the sockets $h^1$, $i^1$. This rotation also is limited to one of 180°, this being brought about on the one hand by the inclined end surfaces of the sockets $h^2$, $i^2$ together with the perforated stop $i^3$ and the pin $h^3$ and on the other hand by the stops $h^4$ and $i^4$. In the measuring disposition, Figs. 29 and 31, the pair of members I, II of the reflecting system lies at the same height as the objective prism $c^0$ and transmits to the latter the axial ray appertaining to the right-hand objective $a$. The transition to the adjusting disposition, Figs. 30, 32 and 33, is carried out by rotating both the tube $g$ relatively to its casing $h$ and this casing relatively to the main casing $i$ through 180°. Of the two axial rays that belonging to the left-hand objective then passes through the pair of members II, I, while that belonging to the right-hand objective enters, after passing below the member II, directly into the objective prism $c^0$.

It is a notable advantage, that the telemeter takes up less space in the adjusting than in the measuring disposition. It will therefore be transported in the adjusting disposition. Hence it will, when being set up again, already be in that disposition, which would otherwise have to be given to it, in order to carry out the adjustment, which is necessary after transport.

I claim:

1. In a telemeter, the optical parts of which comprise two telescope systems and a reflecting system, a base-line within the instrument, adapted to be divided into two component parts, means for altering the position of the optical system connected in one such part relatively to that contained in the other, these means comprising a connection between the two said parts, at least one member of the said reflecting system being movable relatively to the said telescope systems, whereby the said reflecting system is adapted to assume two dispositions, a measuring disposition and an adjusting disposition, the said reflecting system in its measuring disposition being adapted to bring the two axial rays, which on entering the telemeter have a distance between them in the sighting plane equal to the length of the said base-line, closer together in the said plane, each of the said telescope systems being adapted to receive one such axial ray, the error of reflection with the adjusting disposition having the same value and the same sign as that with the measuring disposition, and, with the adjusting disposition, the distance apart of the two entering axial rays in the sighting plane being zero.

2. In a telemeter, the optical parts of which comprise two telescope systems and a reflecting system consisting of an even number of members, which are connected together rigidly in pairs, a base-line within the instrument, adapted to be divided into two component parts, means for altering the position of the optical system contained in one such part relatively to that contained in the other, these means comprising a connection between the two said parts, at least one member of the said reflecting system being movable relatively to the said telescope systems, whereby the said reflecting system is adapted to assume two dispositions, a measuring disposition and an adjusting disposition, the said reflecting system in its measuring disposition being adapted to bring the two axial rays, which on entering the telemeter have a distance between them in the sighting plane equal to the length of the said base-line, closer together in the said plane by a half of the said length, the direction of which entering axial rays in the adjusting disposition is parallel to that of the entering axial rays in the measuring disposition, the error of reflection with the adjusting disposition having the same value and the same sign as that with the measuring disposition, and, with the adjusting disposition, the distance apart of the two entering axial rays in the sighting plane being zero.

RUDOLF STÜTZER.

Witnesse:
PAUL KRÜGER,
RICHARD HAHN.